United States Patent
Biallas et al.

(10) Patent No.: US 9,209,587 B2
(45) Date of Patent: Dec. 8, 2015

(54) ABSORBER FOR TERAHERTZ RADIATION MANAGEMENT

(71) Applicant: JEFFERSON SCIENCE ASSOCIATES, LLC, Newport News, VA (US)

(72) Inventors: George Herman Biallas, Yorktown, VA (US); Cornelis Apeldoorn, Gloucester, VA (US); Gwyn P. Williams, Yorktown, VA (US); Stephen V. Benson, Yorktown, VA (US); Michelle D. Shinn, Newport News, VA (US); John D. Heckman, Lanexa, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 0 days.

(21) Appl. No.: 14/662,322

(22) Filed: Mar. 19, 2015

(65) Prior Publication Data
US 2015/0280386 A1    Oct. 1, 2015

Related U.S. Application Data

(60) Provisional application No. 61/970,421, filed on Mar. 26, 2014.

(51) Int. Cl.
*H01S 3/00* (2006.01)
*H01S 1/00* (2006.01)
*G21K 1/10* (2006.01)
*H01S 3/09* (2006.01)

(52) U.S. Cl.
CPC . *H01S 1/005* (2013.01); *G21K 1/10* (2013.01); *H01S 3/0903* (2013.01)

(58) Field of Classification Search
CPC ........................................... H01S 3/0903
USPC ................................................. 372/2
See application file for complete search history.

(56) References Cited

U.S. PATENT DOCUMENTS

| 5,260,513 A * | 11/1993 | Giles | G01R 29/105 174/390 |
| 7,342,230 B2 * | 3/2008 | Adamski | G01J 3/42 250/341.8 |
| 2002/0097755 A1 * | 7/2002 | Mross | H01S 3/0903 372/9 |

* cited by examiner

*Primary Examiner* — Kinam Park

(57) ABSTRACT

A method and apparatus for minimizing the degradation of power in a free electron laser (FEL) generating terahertz (THz) radiation. The method includes inserting an absorber ring in the FEL beam path for absorbing any irregular THz radiation and thus minimizes the degradation of downstream optics and the resulting degradation of the FEL output power. The absorber ring includes an upstream side, a downstream side, and a plurality of wedges spaced radially around the absorber ring. The wedges form a scallop-like feature on the innermost edges of the absorber ring that acts as an apodizer, stopping diffractive focusing of the THz radiation that is not intercepted by the absorber. Spacing between the scallop-like features and the shape of the features approximates the Bartlett apodization function. The absorber ring provides a smooth intensity distribution, rather than one that is peaked on-center, thereby eliminating minor distortion downstream of the absorber.

19 Claims, 3 Drawing Sheets

ABSORBER FOR TERAHERTZ RADIATION MANAGEMENT

This application claims the priority of Provisional U.S. patent application Ser. No. 61/970,421 filed Mar. 26, 2014.

The United States Government may have certain rights to this invention under Management and Operating Contract No. DE-ACO5-060R23177 from the Department of Energy.

FIELD OF THE INVENTION

The present invention relates to free electron (FEL) lasers and more particularly to a method and apparatus for managing Terahertz radiation in order to minimize the distortion of any downstream mirrors.

BACKGROUND

In a Free Electron Laser (FEL) that uses an energy recovering LINAC as an energy source, Terahertz (THz) radiation may be generated at the first bending dipole downstream of the wiggler. Unfortunately, without absorption or smoothing, the irregular shape of the radiation, further distorted by multiple bounces down the inside surface of the beam tube, distorts the minor downstream of the wiggler, causing the optics to degrade and the FEL to lose power.

Accordingly, in high power Free Electron Lasers, there is a need for a device that manages Terahertz radiation and minimizes the distortion of any downstream minors.

OBJECT OF THE INVENTION

It is therefore an object of the present invention, in a free electron laser generating THz radiation, to provide a method to absorb or smooth any irregular THz radiation and thus minimize the power degradation of the THz beam.

As irregular shaped THz radiation becomes distorted by multiple bounces down the inside surface of the beam tube, it is an object to reduce the deleterious effects of the irregular shaped radiation.

It is a further object to minimize distortion of the mirror downstream of the wiggler thereby minimizing degradation of the optics and the resulting degradation of power output by the FEL.

SUMMARY OF THE INVENTION

The present invention provides a method and apparatus for minimizing the degradation of power in a free electron laser generating THz radiation. The method includes the addition of an absorber ring in the FEL beam path to provide a method to absorb or smooth any irregular THz radiation and thus minimize the degradation of downstream optics and the resulting degradation of the FEL output power. The absorber ring includes an upstream side, a downstream side, and a plurality of wedges spaced radially around the absorber ring. The wedges form a scallop-like feature on the innermost edges of the absorber ring. The scallop-like feature acts as an apodizer, stopping diffractive focusing of the THz radiation that is not intercepted by the absorber. The spacing between the scallop-like features and the shape of the features approximates the Bartlett apodization function. Adding the absorber ring to the beam path and operating in the THz spectral region results in a smooth intensity distribution after the absorber has been traversed, rather than one that is peaked on-center, thereby eliminating minor distortion downstream of the absorber.

BRIEF DESCRIPTION OF THE DRAWINGS

Reference is made herein to the accompanying drawings, which are not necessarily drawn to scale, and wherein.

DETAILED DESCRIPTION

Figure 1:
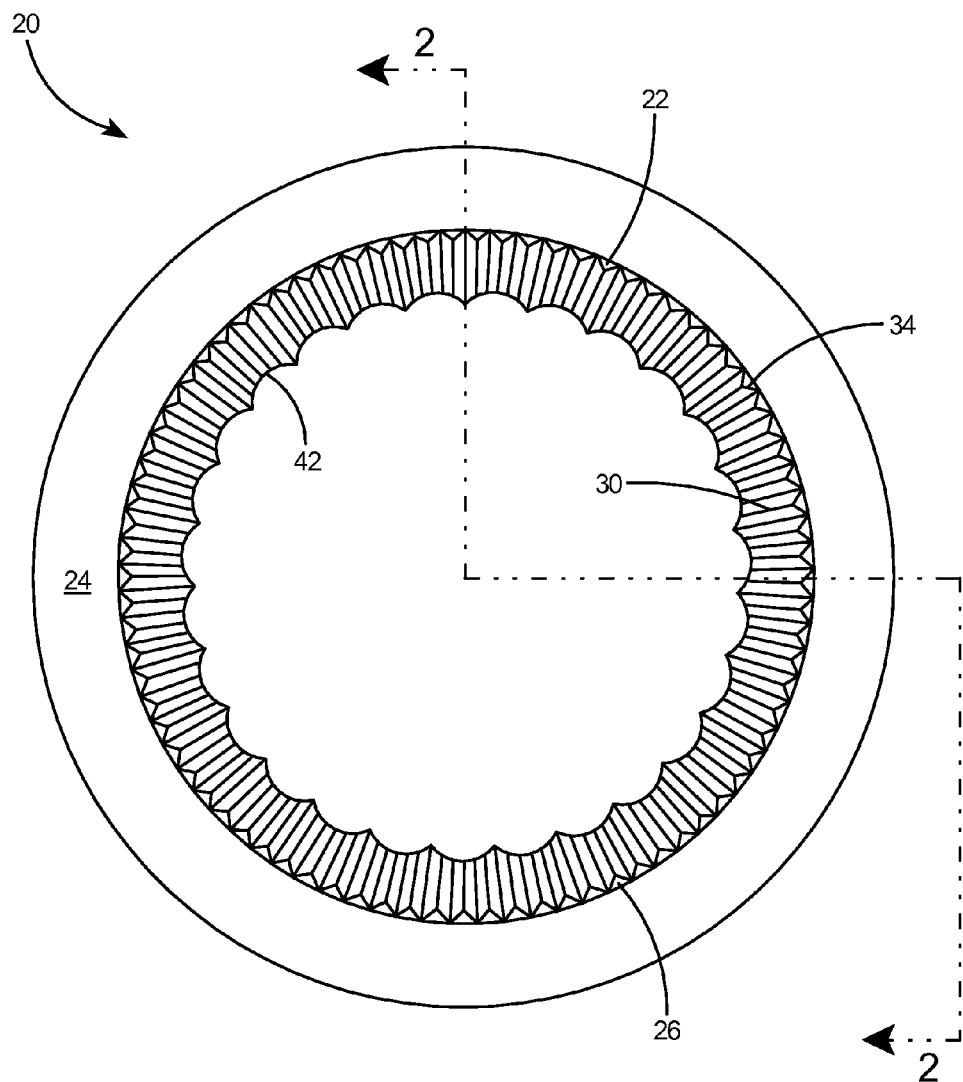
FIG. 1 is a front elevation view of an absorber for terahertz radiation management according to the present invention.
Figure 2:
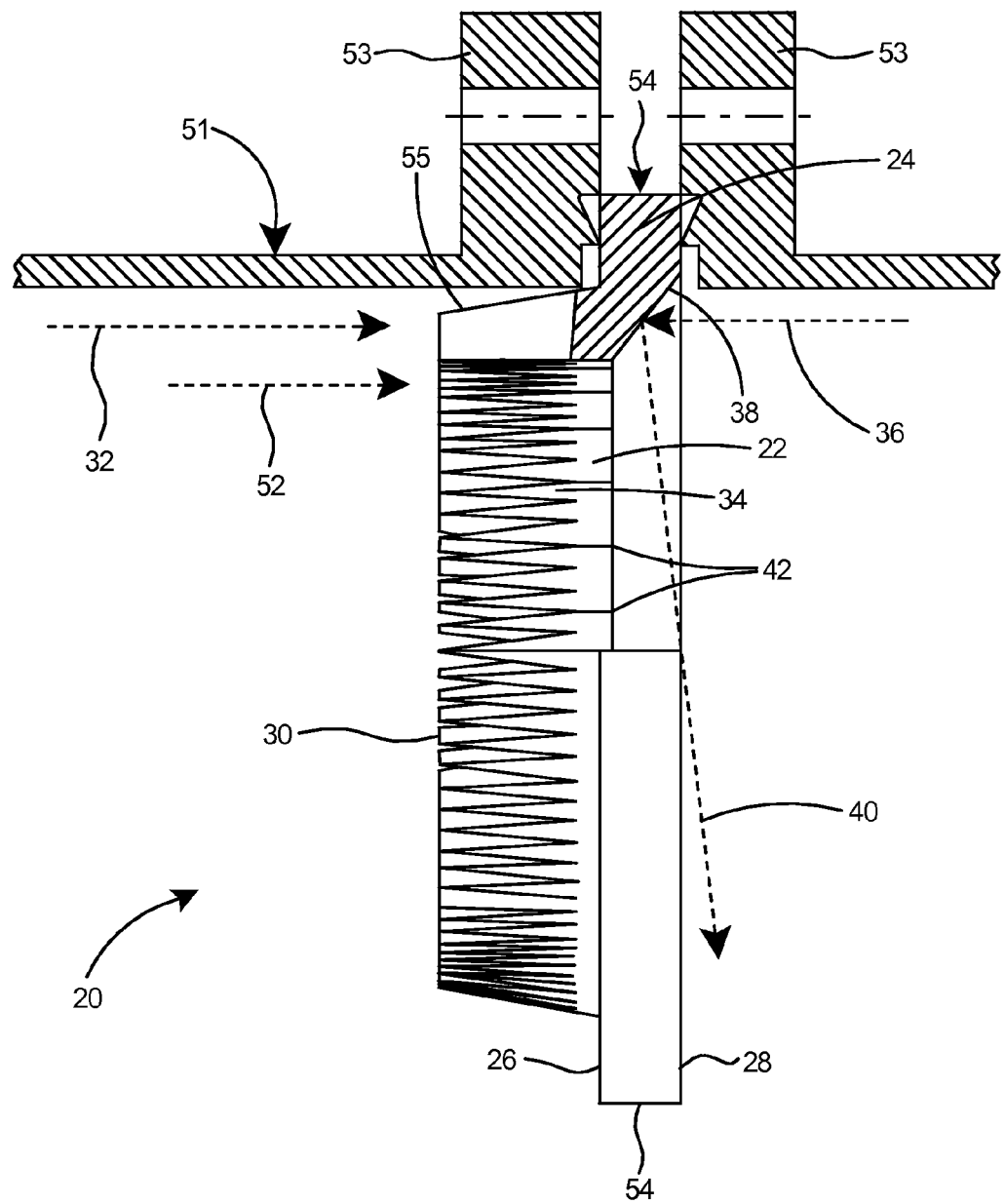
FIG. 2 is a sectional view of the absorber taken along line 2-2 of FIG. 1.

Referring to FIGS. 1 and 2, an absorber 20 for terahertz (THz) radiation is includes a ring-like constriction 22 to the inside diameter of the beam pipe of the optical cavity resonator of a Free Electron Laser (FEL) that uses an energy recovering LINAC as an energy source. The set of absorbers removes or smoothes the terahertz radiation generated at the first bending dipole downstream of the wiggler. Without absorption or smoothing, the irregular shape of the radiation, further distorted by multiple bounces down the inside surface of the beam tube distorts the downstream minor.

The THz absorber 20 is made in the form and temper of a CF copper gasket or ring-shaped gasket 24 that is made very thick. The absorber 20 includes an upstream side 26 and a downstream side 28. The upstream radial edge 30 of the absorber ring's constriction into the beam pipe 22 absorbs the portion of the primary THz radiation 32 that is near the inside of the beam pipe 51. The radial surface uses the technique of absorption by multiple bounces on the surface of metallic wedges 34, which may be formed using wire-Electro Discharge Machining or other machining methods. A half wedge size taper to the outside diametral surface of these wedges 55 may be employed to provide multiple bounce absorption between that wedge surface and the beam tube. The smaller quantities of secondary radiation 36 bouncing back upstream are removed by the process of bouncing off the conical surface 38 provided on the downstream side 28 of the ring. The bounce 40 converts axially directed radiation to nearly radial radiation where it is again absorbed by multiple bounces against the local beam tube.

Additionally, as shown in FIGS. 1 and 2, the scallop-like feature 42 on the innermost edges known as the apodizer stops diffractive focusing of the radiation 52, not intercepted by the absorber. The spacing between the scallop-like features 42, and the shape of the features, approximates the Bartlett apodization function. In the THz spectral region, this results in a smooth intensity distribution after the absorbers have been traversed, rather than one that is peaked on-center, eliminating mirror distortion. Energy absorbed by the ring is transferred, in the simplest embodiment of the absorber, directly to its contact surfaces with the pair of flanges 53 and thence to the surrounding air. Temperature instrumentation may be attached to the outside diameter surface of the ring 54.

Figure 4:
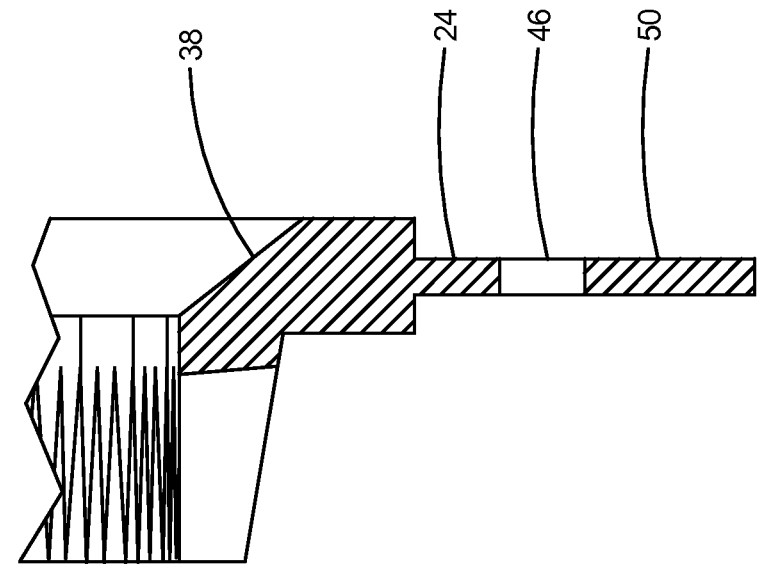
FIG. 4 is a sectional view of the gasket edge of the absorber including a disk extension integral with the ring-shaped gasket portion of the THz absorber.
Figure 3:
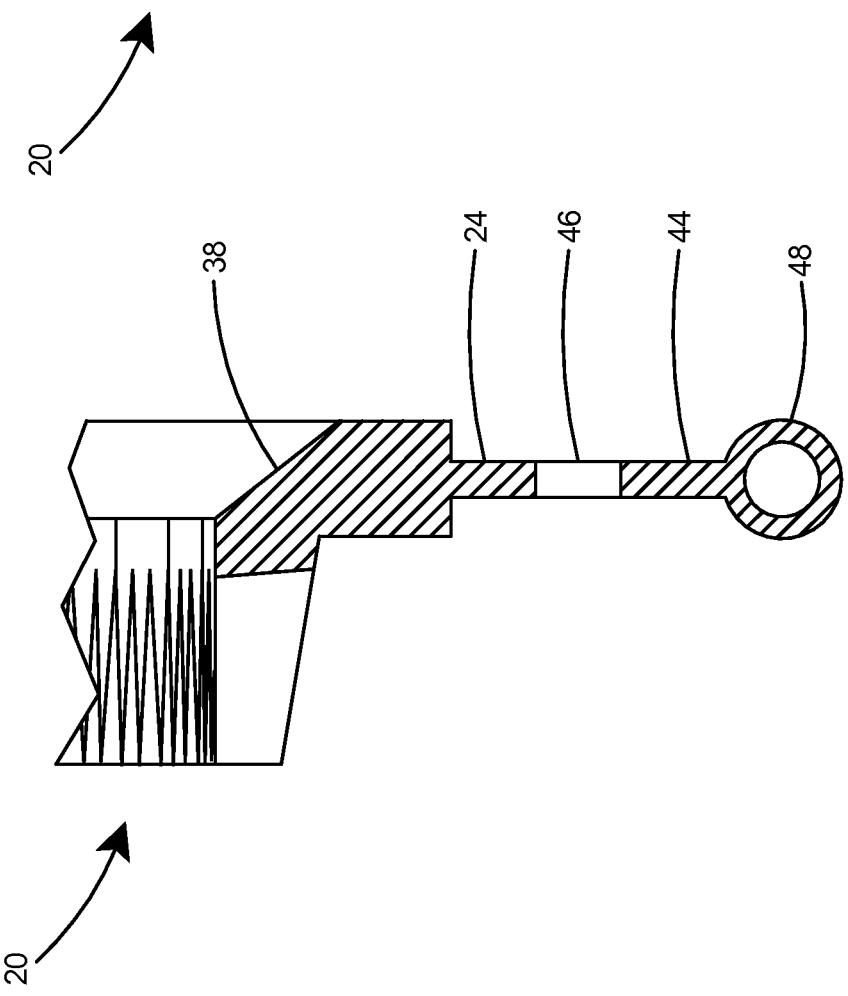
FIG. 3 is a sectional view of the gasket edge of the absorber including a water cooling tube integral with the ring-shaped gasket portion of the THz absorber.

According to the present invention, an absorber for THz radiation may be adapted for enhanced cooling by either cooling fluids or by air convection. With reference to FIG. 3, the absorber may include a disk 44 that extends beyond the gasket portion 24 and clearance holes 46 for flange bolts (not shown), and a cooling tube 48 integral with the disk. The cooling tube 48 would extend circumferentially around the disk 44 and provide cooling for the absorber. An alternative cooling embodiment is depicted in FIG. 4, in which a simple disk extension 50 extends beyond the gasket portion 24 thereby enabling air or fan cooling of the absorber. The disk extension 50 extends circumferentially around the disk 44. Temperature instrumentation may also be attached to this disk. Most preferably, the THz absorber ring is constructed of copper.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment herein was chosen and described in order to best explain the principles of the invention and the practical application, and to enable others of ordinary skill in the art to understand the invention for various embodiments with various modifications as are suited to the particular use contemplated.

What is claimed is:

1. A method for minimizing the power degradation of a terahertz (THz) beam in a free electron laser (FEL) having a beam tube, comprising:
    a. providing a THz absorber ring having an upstream side, a downstream side, and a plurality of wedges spaced radially around the upstream side of the absorber ring;
    b. placing said THz absorber ring within said beam tube with the upstream side of said THz absorber ring facing the oncoming THz beam; and
    c. absorbing irregular THz radiation to minimize the power degradation of the THz beam.

2. The method of claim 1, which includes providing a means for stopping diffractive focusing of the THz radiation that is not intercepted by the absorber.

3. The method of claim 2, wherein said means for stopping diffractive focusing of the THz radiation includes providing scallop-like features on the innermost edges of the absorber ring.

4. The method of claim 3, wherein said scallop-like features form an apodizer.

5. The method of claim 3, wherein said scallop-like features include a spacing there between and a shape that approximates the Bartlett apodization function.

6. A method for minimizing the power degradation of a terahertz (THz) beam in a free electron laser (FEL), comprising:
    a. providing a THz absorber ring having an upstream side, a downstream side, and a plurality of wedges spaced radially around the upstream side of the absorber ring;
    b. placing said THz absorber ring with the upstream side facing the THz beam;
    c. absorbing irregular THz radiation to minimize the power degradation of the THz beam; and
    providing a means for stopping diffractive focusing of the THz radiation that is not intercepted by the absorber.

7. The method of claim 6, wherein said means for stopping diffractive focusing of the THz radiation includes providing scallop-like features on the innermost edges of the absorber ring.

8. The method of claim 7, wherein said scallop-like features form an apodizer.

9. The method of claim 7, wherein said scallop-like features include a spacing there between and a shape that approximates the Bartlett apodization function.

10. A terahertz (THz) absorber ring for mounting in the inside diameter of a beam pipe of the optical cavity resonator of a free electron laser (FEL), comprising:
    a ring-shaped gasket adapted for mounting between two flanges of the beam pipe;
    a ring-like constriction extending inward of the ring-shaped gasket;
    said THz absorber ring having an upstream side and a downstream side; and
    a plurality of wedges spaced radially around said upstream side of said ring-like constriction.

11. The THz absorber of claim 10, wherein
    said wedges include innermost edges; and
    said wedges forming scallop-like features on the innermost edges of said THz absorber ring, said scallop-like features act as an apodizer, stopping diffractive focusing of the THz radiation that is not intercepted by the THz absorber.

12. The THz absorber of claim 11, wherein
    the scallop-like features include a spacing and a shape; and
    the spacing between the scallop-like features and the shape of the features approximates the Bartlett apodization function.

13. The THz absorber of claim 10, wherein each of said wedges includes an upstream radial edge.

14. The THz absorber of claim 10, including a conical surface on the downstream side of said THz absorber, said conical surface removing secondary radiation from bouncing upstream in said beam pipe.

15. The THz absorber of claim 10, including a disk extending outward from said gasket portion.

16. The THz absorber of claim 15, including a cooling tube integral with said disk, said cooling tube extending circumferentially around said disk.

17. The THz absorber of claim 15, including a disk extension integral with said disk, said disk extension extending circumferentially around said disk.

18. The THz absorber of claim 10, wherein said THz absorber is constructed of copper.

19. The method of claim 1, which includes providing a conical surface on the downstream side of said THz absorber ring, said conical surface removing secondary radiation from bouncing upstream in said beam pipe.

* * * * *